United States Patent
Jain

(10) Patent No.: US 8,214,396 B2
(45) Date of Patent: Jul. 3, 2012

(54) LEAD MANAGEMENT

(75) Inventor: Amit Jain, Irvine, CA (US)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 12/104,858

(22) Filed: Apr. 17, 2008

(65) Prior Publication Data

US 2009/0265312 A1    Oct. 22, 2009

(51) Int. Cl.
*G06F 7/00* (2006.01)
(52) U.S. Cl. .......................................... 707/783
(58) Field of Classification Search .................. 707/783, 707/754
See application file for complete search history.

(56) References Cited

U.S. PATENT DOCUMENTS

| | | | |
|---|---|---|---|
| 6,097,792 A | 8/2000 | Thornton | |
| 6,636,590 B1 | 10/2003 | Jacob et al. | |
| 6,704,403 B2 | 3/2004 | Lurie et al. | |
| 6,801,899 B2 | 10/2004 | Lauffer | |
| 6,865,540 B1 | 3/2005 | Faber et al. | |
| 2004/0030893 A1* | 2/2004 | Karamchedu et al. | 713/168 |
| 2005/0044036 A1 | 2/2005 | Harrington et al. | |
| 2006/0064340 A1 | 3/2006 | Cook | |
| 2009/0138378 A1* | 5/2009 | Suba et al. | 705/27 |
| 2009/0144829 A1* | 6/2009 | Grigsby et al. | 726/26 |

FOREIGN PATENT DOCUMENTS

WO        WO 00/72210 A1    11/2000

OTHER PUBLICATIONS

U.S. Appl. No. 12/234,380, Belwadi et al., filed Sep. 19, 2008.
PCT International Search Report and the Written Opinion, PCT/US2009/040869, mailed Sep. 30, 2009, 11 pages.

\* cited by examiner

*Primary Examiner* — Truong Vo
(74) *Attorney, Agent, or Firm* — Fish & Richardson P.C.

(57) ABSTRACT

Systems and methods for lead management. Lead management systems can collect contact information and service information associated with a user and store the contact information to a contact data store. The lead management system can submit an the service information and obfuscated contact information to a provider on behalf of the user. The lead management system can thereafter present communications from the provider to the user.

20 Claims, 6 Drawing Sheets

LEAD MANAGEMENT

BACKGROUND

This disclosure is related to managing customer leads.

Sellers and service providers often work to generate leads for a company. The popularity of the internet has led to users searching for sellers and service providers over the internet. Various websites are available that collect information about a user searching for a product or service. In sales, such user information can be referred to as a lead. Leads can be used by companies providing the product or service to generate sales.

However, users may be reluctant to provide their personal information for fear that the information will be resold to providers without the user's consent. Moreover, the personal information, once in the seller's database, typically remains there until the seller removes the information. Thus, the seller can continue to try to market to the user, even though the user may not want to be contacted any further.

SUMMARY

Systems, methods and computer readable media for lead management are provided. Example systems can include a user interface module, an obfuscation module and a communications interface. The user interface module can provide a user interface that can receive a request from a user for an offering. The user interface can also receive service information and contact information associated with the user. The obfuscation module can generate obfuscated contact information associated with the user. The communications interface can submit the obfuscated contact information and service information to a provider associated with the requested offering. The communications interface can also receive a communication from the provider and can present the communication to the user using the contact information associated with the user.

Example methods for providing lead management can include: receiving a request from a user to locate a provider associated with a product or service offering specified by the request; receiving service information and contact information from the user, the service information being related to the service requested by the user; generating obfuscated contact information associated with the user; submitting a lead to the provider, the lead comprising the service information and the obfuscated contact information associated with the user; receiving a communication from the provider comprising audio, video or textual communication data and the obfuscated contact information; and presenting the communication to the user using the contact information associated with the user.

Other implementations are disclosed, including implementations directed to systems, methods, apparatuses, computer-readable mediums and user interfaces.

DETAILED DESCRIPTION

Lead management systems can facilitate contact between users and providers. Users can provide their contact information to the lead management system. The lead management system can generate obfuscated contact information associated with the user. The obfuscated contact information can include a randomly generated electronic mail address or an extension associated with an exchange. Service information can be submitted with obfuscated contact information to a provider. The provider can send communications to the user using the obfuscated contact information, and the lead management system can resolve the obfuscated contact information (e.g., random e-mail address and/or extension) to the user's actual contact information (e.g., user e-mail address and/or user telephone number) and present the communications to the user.

Figure 1:
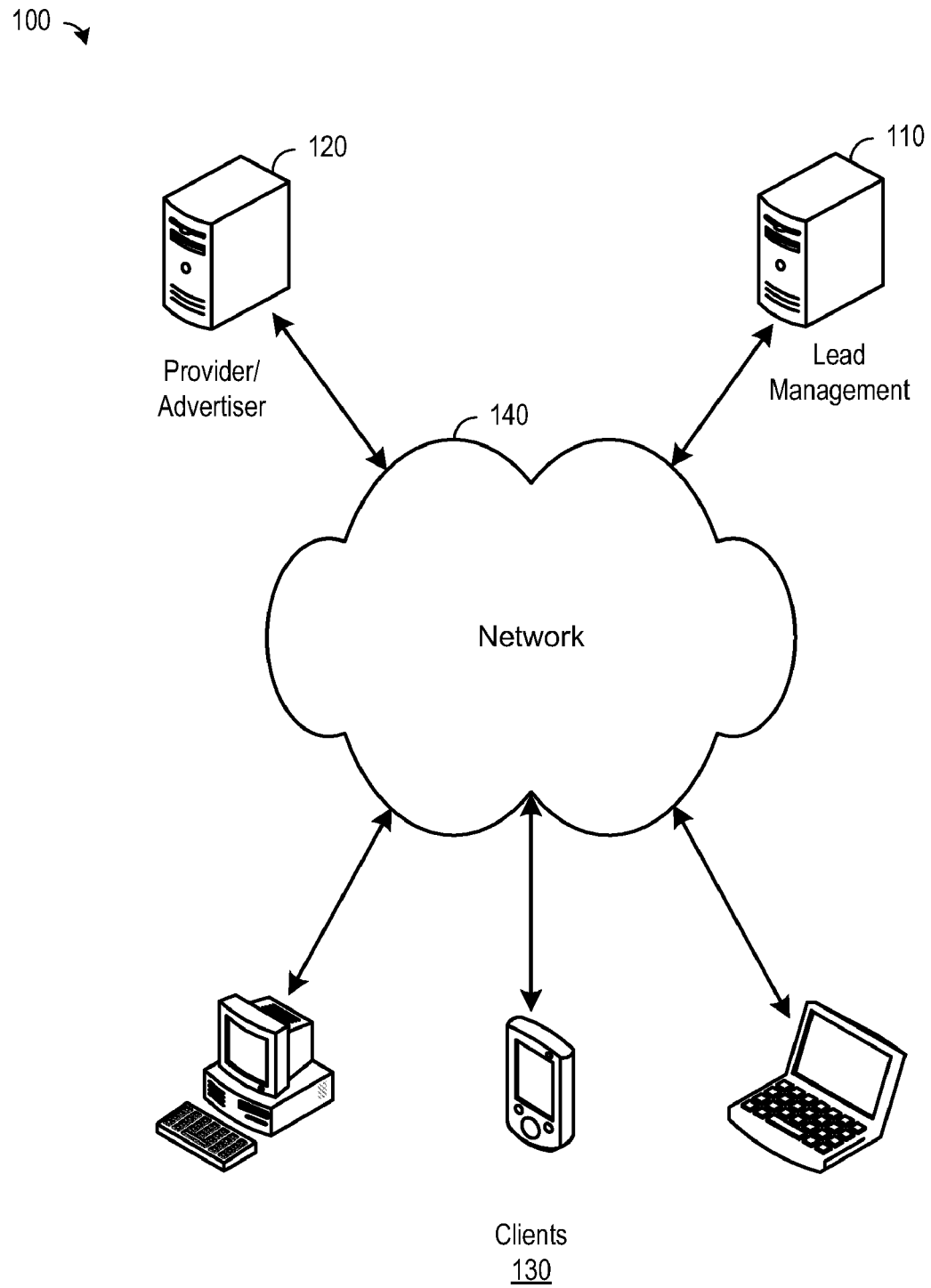
FIG. 1 is a block diagram of an example network architecture that can provide lead management.

FIG. 1 is a block diagram of an example network architecture 100 including a lead management system 110. In some implementations, the lead management system 110 can be a server operable to communicate with providers/advertisers 120 and users 130 through a network 140. The providers/advertisers 120 can be providers of products or services for consumption by users 130. The lead management system 110 can facilitate communication between the users 130 and the providers/advertisers 120.

In some implementations, the provider/advertiser 120 can communicate provider information to the lead management system. The provider information can include the provider's ability to service various requests (e.g., requests for products or services). For example, when the provider is a mortgage provider, the mortgage provider can identify the types of loans (e.g., small loans, mid-size loans, or large loans) the mortgage provider can source.

In additional implementations, the provider information can include bidding information from the provider. The bidding information can indicate the amount the provider is willing to pay to the lead management system 110 to be listed as a referral. For example, where the provider 120 is a mortgage broker, the provider 120 may be willing to pay a certain amount for referrals of potential customers shopping for loans. Moreover, the provider may be willing to pay more for larger loans than for smaller loans. Thus, the bidding information can be multidimensional based upon the product or service offered because the provider is willing to pay more for a large margin product or service than a small margin product or service.

The lead management system 110 can aggregate provider information received from the providers 120. The aggregated information can be used to provide users 130 with information about the providers. In some implementations, the lead management system 110 can receive requests (e.g., queries) from users with regard to a specific product or service. The request can be compared to the providers to identify which of the providers 120 is qualified to handle the request. Moreover, the lead management system 110 can analyze the provider information to determine a presentation order associated with qualified providers 120. Thus, a presentation order can be based upon relevance of the provider information to the request and upon the amount a provider is willing to pay for the exposure. For example, while providers associated with provider information that is not relevant to the request will not be presented to the user 130, providers associated with provider information might be listed in an order based upon the bids associated with the respective providers and the relevance of the providers' information.

In some implementations, the lead management system 110 can interact with the user 130 to collect contact information from the user. The lead management system 110 can thereby facilitate communications between the user 130 and provider(s) 120. In some implementations, the user can direct the lead management system 110 to facilitate contact with selected providers based upon input provided by the user 130. For example, if the user 130 was provided with a list of four qualified providers 120 including A, B, C and D, the user can select A and C from the qualified providers 120. The lead management system 110 in this example would thereby facilitate contact between the user 130 and the selected providers A and C.

In further implementations, the lead management system 110 can provide obfuscated contact information to the providers 120. The obfuscated contact information can require that the provider 120 communicate with the user 130 through the lead management system 110. For example, the obfuscated contact information can include a randomly generated electronic mail (e-mail) address directed to a domain associated with the lead management system 110. Thus, any messages addressed to the randomly generated e-mail address will be received by an electronic mail server associated with the lead management system 110. The electronic mail server can determine that the address is associated with a user and can resolve the randomly generated e-mail address to send the message to the user 130 using his/her contact information previously provided. In other examples, the obfuscated contact information can include an extension. In such examples, the provider can call an private branch exchange (PBX) associated with the lead management system 110 and enter the extension. The PBX can resolve the extension to a telephone number based upon identifying the user and associated contact information. The PBX can attempt to establish a connection to the telephone number.

In some instances, outgoing messages left on voice mail systems can inadvertently provide identifying information associated with the user. Thus, in some implementations, the PBX can detect when a voice mail system has responded to the connection request. In such instances, the PBX can automatically drop the voice mail system. In some implementations, the connection to the voice mail system can be dropped prior to connecting the provider to the call. Thus, the provider would not overhear any of the outgoing message from the voice mail system. In some implementations, the PBX can then record a message from the provider for presentation to the user 130. In various examples, the recorded message can then be presented (e.g., forwarded) to the user as an attachment to an electronic message or through the telephone number without the presence of the provider.

Figure 2:
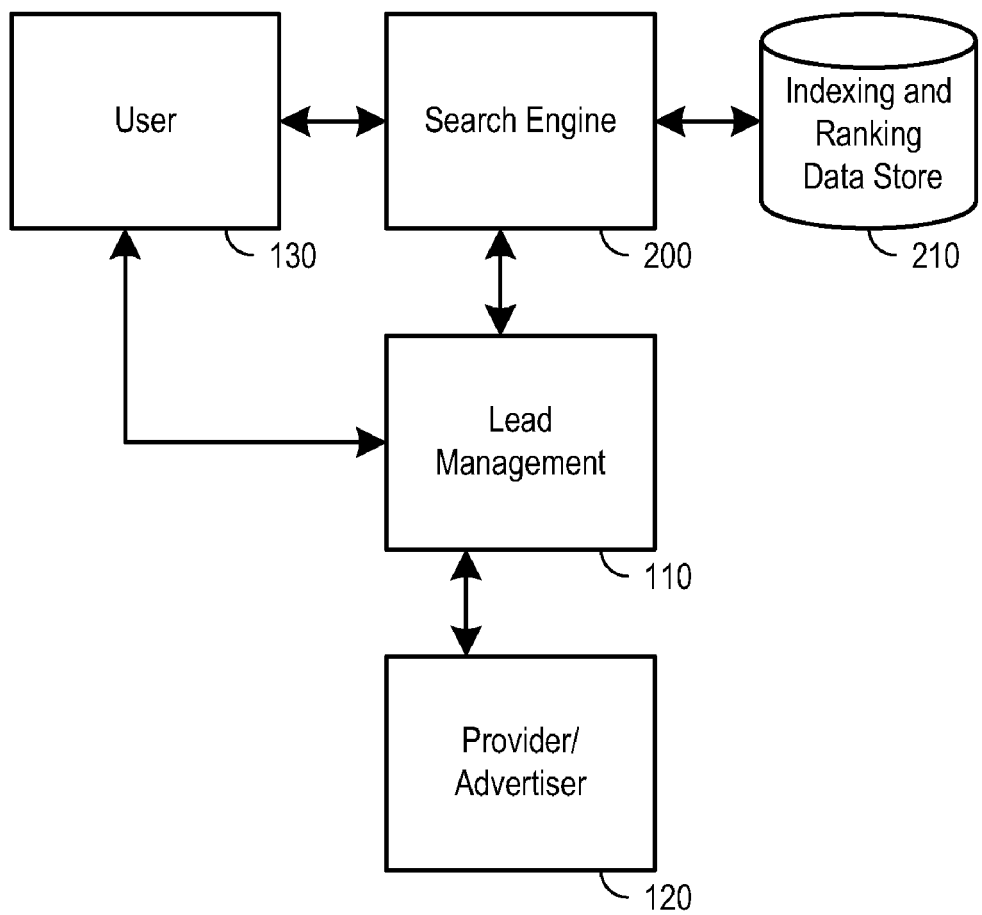
FIG. 2 is a block diagram of an example lead management system receiving leads through a search engine.

FIG. 2 is a block diagram of an example lead management system 110 receiving leads through a search engine 200. A user 130 can communicate with a search engine 200 in an attempt to locate a provider 120. For example, the user can submit a query to the search engine 200. In other examples, the user can submit a query to other product or service location engines. The search engine 200 can compare the query to an index stored in an index/ranking data store 210 to determine relevance of the various content included in the index 210. The search engine 200 can also retrieve ranking information from the index/ranking data store 210 associated with the relevant content to determine the quality of the content. The ranking information and relevance information can be used to determine an order in which to present results associated with the query. In further implementations, bidding information can be used to determine the order in which to present the results associated with the query.

In some implementations, the search engine communicates with the lead management system based upon keywords included in queries received from the user. For example, if the user enters the keyword mortgage, the search engine can be configured to recognize that the user is searching for information on mortgages, and can obtain information from the lead management system for presentation to the user.

In other implementations, rules can be developed triggered by combinations of words used in a query to determine when the user is searching for a product or service provided by an advertiser/provider 120. For example, if the user 130 enters the search query "mortgage crisis news," the search engine 200 can determine that the user 130 is probably not searching for mortgage brokers, whereas if the user 130 enters the search query "mortgage San Jose", the user 130 is likely searching for a mortgage provider in or around San Jose. In further implementations, the search engine 200 can analyze query logs to derive rules for when a user 130 is likely to be searching for a provider 120 versus when a user 130 is more likely to be searching for generic news or information. In other implementations, the search engine 200 can analyze the results from a search query and analyze the results for similarities to advertisers/providers 120 to identify when it would be appropriate to communicate with the lead management system 110 to present providers/advertisers 120 to the user as part of the search results.

In some implementations, the lead management system 110 can provide a user interface to the user 130 through the search engine 200. The user interface can be provided by a user interface module located within the lead management system 110. The search engine 200 can receive the user interface from the lead management system 110 and can include the user interface within the search results provided to the user.

In some implementations, lead management system 110 can use the user interface to collect information from the user 130. The information can include, for example, contact information associated with the user 130, as well as service information. For example, contact information can include the user's name, a telephone number, and/or an e-mail address or postal address. The service information can include information about the product or service about which the user 130 is requesting information. For example, the user 130 might be requesting information about large screen televisions. The service information can include the types of technology the user is interested (e.g., plasma, digital light processing (DLP), LCD, etc.), as well as size information and/or price information. In various examples, the user interface can allow the user 130 to select multiple technologies, sizes, and or price ranges.

In some implementations, the collected information can be received by the search engine 200 and provided to the lead management system 110. In other implementations, the collected information can be forwarded directly to the lead management system 110, thereby ensuring that a search engine does not record the personal information provided by the user 130. For example, a button representation included in the results page provided to the user 130 can send the collected information to the search engine 200 to be parsed and provided to the lead management system 110, or can send the collected information directly to the lead management system 110 without inclusion of the search engine 200. In other implementations, the lead management system 110 can be included within a search engine 200.

Figure 3:
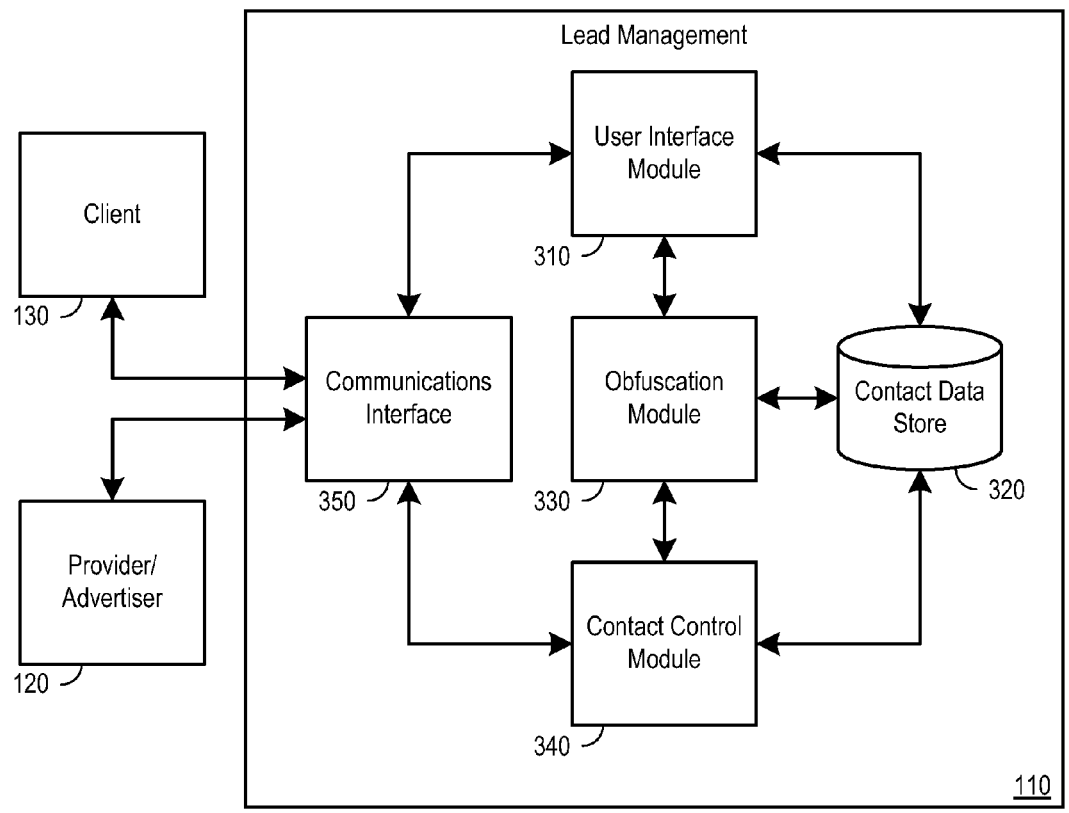
FIG. 3 is a block diagram of an example lead management system.

FIG. 3 is a block diagram of an example lead management system 110. The lead management system 110 can include a user interface module 310, a contact data store 320, an obfuscation module 330, a contact control module 340 and a communications interface 350. The user interface module 310 can be configured to provide a user interface to users 130 and to receive information from the users 130 through the communications interface 350. In some examples, the communications interface 350 can be an ethernet interface operable to communicate internet protocol packets over a network (e.g., network 140 of FIG. 1). The information received from the user 130 through the communications interface 350 can include information, such as, for example, contact information and service information associated with the user 130. The contact information in various examples, can include name, e-mail address(es), telephone number(s), postal address(es), and combinations thereof. The service information can include information about the products or services the user is requesting information.

In some implementations, the information received from the user can be stored in a contact data store 320. The contact data store can be a relational database containing identifying information associated with the user. For example, a record associated with a user can include name, telephone number(s), e-mail address(es), postal address(es), product or service requested, product information, etc.

In further implementations, an obfuscation module 330 can be used to generate obfuscated contact information associated with the user. The obfuscation module, for example, can include a list of e-mail addresses and PBX extensions for use by the lead management system 110. The obfuscation module 330 can assign the e-mail addresses and/or PBX extensions to users randomly as the user selects a provider from which to receive communications. The obfuscated e-mail addresses and PBX extensions can be stored in the contact data store 320 with an associated user record. In some implementations, obfuscated contact information can be reused. For example, when two users are requesting communication with different sets of providers, the same obfuscated contact information can be used, and the providers from whom the communications addressed to the obfuscated contact information is being received can be used to differentiate which of the users for whom the communication is intended.

In some implementations, the contact control module 340 can communicate the obfuscated contact information along with associated service information to providers 120 based upon input from the user 130. The obfuscated contact information and service information can be provided to the providers 120 through the communications interface 350. In additional implementations, the user interface can enable the user 130 to communicate which provider(s) 120 the obfuscated contact information and service information is provided. Moreover, the user interface provided by the user interface module 310 can obtain contact preferences for the user 130. Contact preferences can include a contact period, preferred mode of communication, and provider preferences. The contact period, for example, can define periods of time during the day during which the user 130 has indicated contact can be made, and/or a contact expiration (e.g., a period of days within which the communications from the provider 120 will be presented to the user 130). The preferred mode of communication, for example, can identify whether the user would prefer to receive communications using e-mail, telephone, short message service (SMS), instant messaging, videoconferencing, etc. Provider preferences can include those providers 120 which the user 130 would like to receive contact. In various implementations, the user 130 can update the preferences through the user interface provided by the user interface module 310 at any time. For example, if the user 130 wanted to terminate communications from a particular provider 120, the user 130 could provide a termination request to the lead management system 110 by deselecting the provider 120 from the provider preferences.

Subsequent to providing the obfuscated contact information to the provider 120 through the communications interface 350, the lead management system 110 can receive communications intended for the user 130 through the communications interface 350. The communications can include audio, video or textual communication data intended to provide information to the user about the goods or services offered by the provider 120. For example, the communications can include marketing materials, product information, and/or a sales pitch associated with the good or service offered by the provider 120.

In some implementations, the communications are directed to the lead management system 110 based upon the obfuscated contact information sent to the provider(s) 120. For example, the obfuscated contact information can include a domain associated with the lead management system 110, a telephone number associated with a PBX controlled by the lead management system 110, etc. In still further examples, a telephone number can be assigned to a user in response to receiving the contact information and service information from the user. In such examples, the assigned telephone number can be resolved directly to the user's contact information if the contact preferences associated with the user do not preempt connection of a telephone call from the provider.

Upon receiving communications from the provider, the contact control module can use the obfuscated contact information to query the contact data store 320 to identify a user 130 associated with the obfuscated contact information. Contact information and preferences associated with the identified user 130 can be retrieved to determine whether to present the communication to the user 130. For example, if the preference information indicates that contact with a provider has expired or is subject to a termination request, the communication is not presented to the user. In some examples, contacts with providers can be provided with a default expiration. In further examples, the default expiration can be static or dynamic. A static expiration can indicate that the contact control module 340 will no longer present communications from a provider 120 to the user 130 after a specified period of time from the creation of the obfuscated contact information. A dynamic expiration can indicate that the contact control module 340 will no longer present communications from a provider 120 to the user 130 after a specified period of non-use. Thus, if the dynamic expiration is three days, the expiration could be indefinitely extended based upon communications being received using the obfuscated contact information. In other examples, the dynamic expiration can be based upon the last communication originating from the user 130 to the provider 120 using the obfuscated contact information.

In some implementations, the obfuscation module 340 can create an obfuscated provider contact information. The obfuscated provider contact information can facilitate communications originating from the user 130 to the provider 120 which do not inadvertently reveal personal contact information associated with the user 130. For example, if a user 130 received a message from the provider 120 through e-mail, the message would include obfuscated provider contact information requiring that replies to the message travel through the lead management system 110 unless the user 130 chooses to communicate with the provider 120 outside of the lead management system 110, thereby revealing his or her identity to the provider 120. In examples using telephone contact, the user can be provided with instruction on dialing into the PBX associated with the lead management system 110 and entering an extension associated with the provider 120 in order to conceal his/her contact information.

Figure 4:
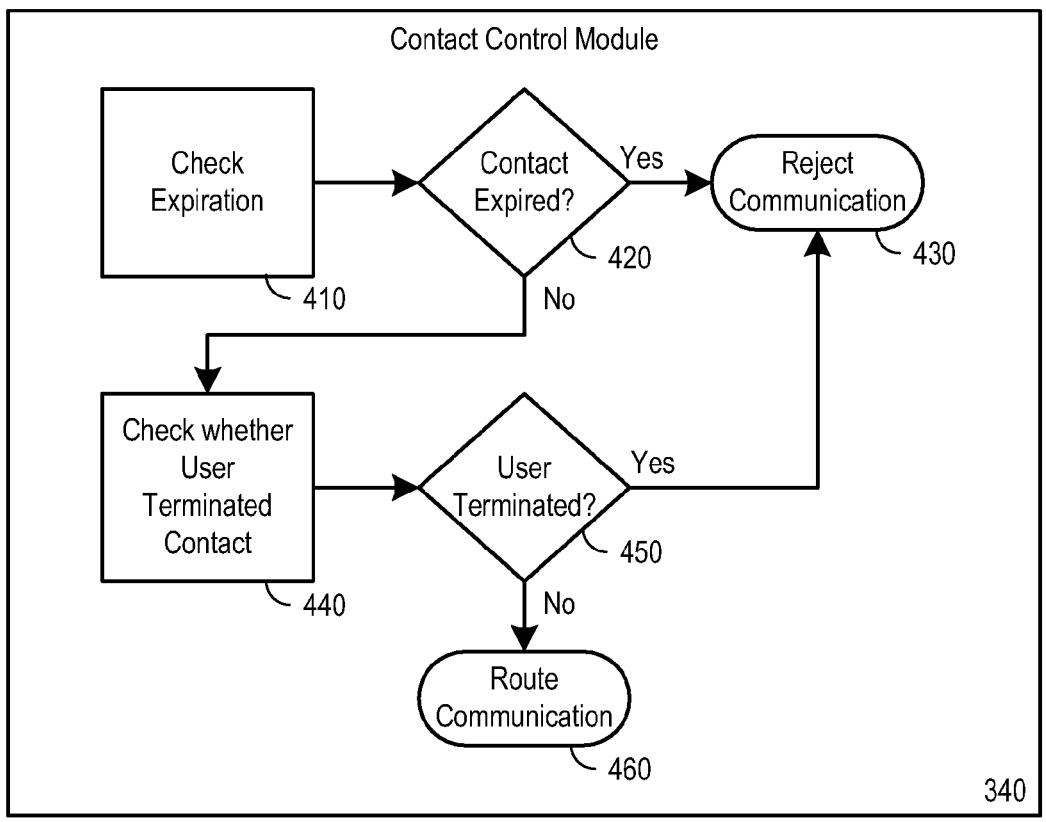
FIG. 4 is a block diagram of an example contact control module.

FIG. 4 is a block diagram of an example contact control module 340. In some implementations, the contact control module 340 can include a stage 410 operable to check an expiration associated with obfuscated contact information. In various examples the expiration can be provided by the user or can be automatically set by the lead management system.

The contact control module 340 can make a determination whether the contact has expired at stage 420. The expiration can be based upon a default expiration of contact between a user and a provider, or can be a user defined expiration of contact between the user and the provider. In some implementations, the expiration of obfuscated contact information can depend upon the particular provider attempting to make contact with the user. For example, the obfuscated contact information can specify that communications from provider A should not be presented after two days, while communications from provider B should not be presented after five days. In such an example, communications from provider A would not be presented after the second day, while communications from provider A would be presented until the fifth day. If a contact period associated with the provider and the user has expired, the communication can be rejected at stage 430.

The contact control module 340 can retrieve any termination requests that have been received from the user at stage 440. In some implementations, a termination request can be received through a user interface provided by a user interface module. In such implementations, the use can specify through the user interface that the system should no longer forward communications from one or more specified providers.

The contact control module 340 can make a determination whether any existing termination requests are associated with the current provider at stage 450. The termination requests can be made for one or more providers to whom obfuscated contact information has previously been provided. If the provider associated with the current communication is associated with a termination request, the communication is rejected at stage 430. Otherwise the communication is presented to the user at stage 460.

Figure 5:
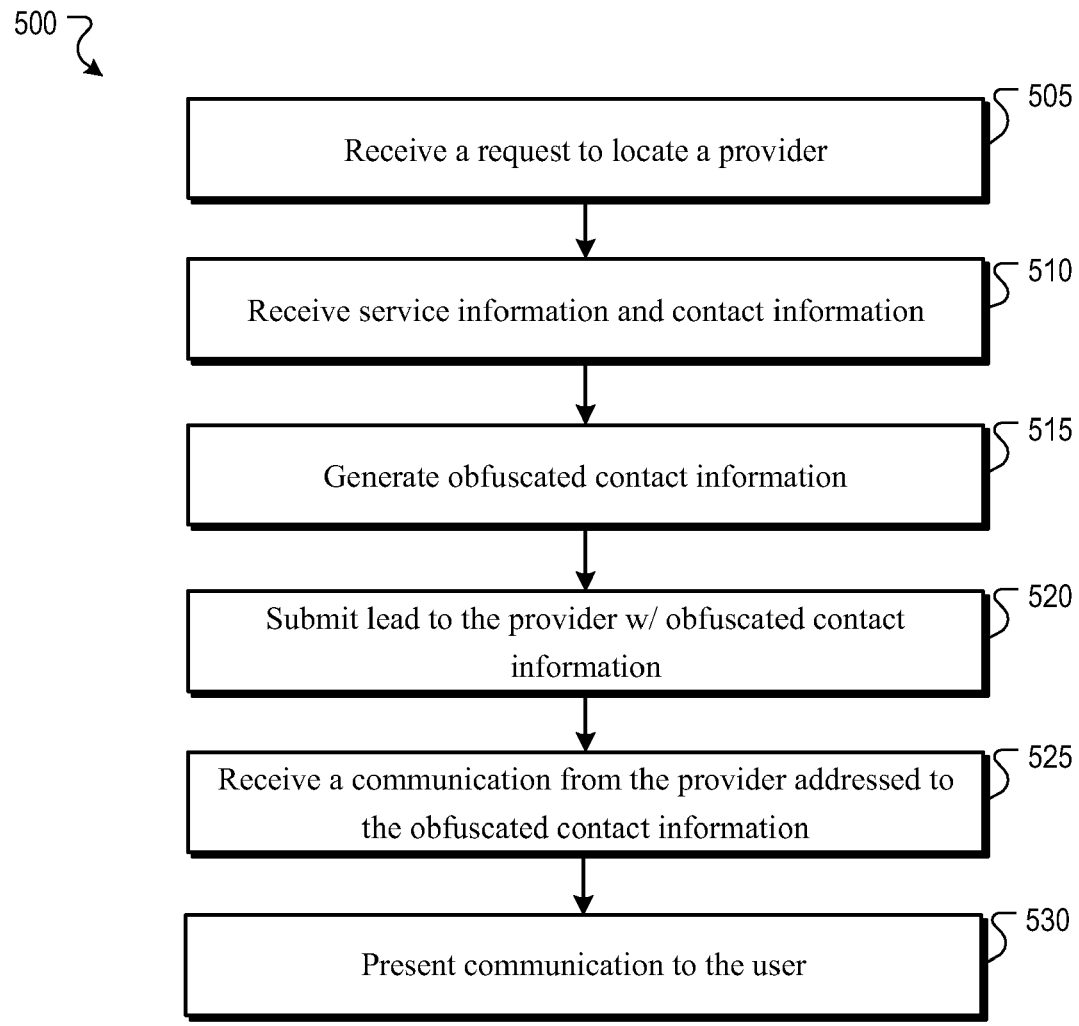
FIG. 5 is a flowchart of an example method for lead management.

FIG. 5 is a flowchart of an example method 500 for lead management. At stage 505 a request to locate a provider is received. The request to locate a provider can be received, for example, by a search engine (e.g., search engine 200 of FIG. 2) or by a communications interface (e.g., communications interface 350 of FIG. 3) associated with a lead management system (e.g., lead management system 110 of FIG. 1). In some implementations, the request to locate a provider is received in the form of a search query. In other implementations, the request to located a provider is received through a user interface provided to the user by a user interface module (e.g., user interface module 310 of FIG. 3). The request can be compared to provider information received from providers (e.g., providers 120 of FIG. 1) to determine relevance of available providers to the search query of service information.

At stage 510, service information and contact information can be received. Service information and contact information can be received, for example, by a communications interface (e.g., communications interface 350 of FIG. 3) through a user interface provided by a user interface module (e.g., user interface module 310 of FIG. 3). and specifies service information associated with the user's requirements. In some implementations, the service information can be compared to provider information supplied by providers to identify qualified providers. In further implementations, qualified providers can be based upon the relevance of the provider information to the service information supplied by the user and based upon bidding information associated with the providers. Qualified providers can be presented to the user, for example, using a user interface provided by the user interface module.

At stage 515, obfuscated contact information can be generated. Obfuscated contact information can be generated, for example, by an obfuscation module (e.g., obfuscation module 330 of FIG. 3). In some implementations, the obfuscated contact information can include randomly assigned e-mail addresses and/or randomly assigned telephone extensions. The randomly assigned e-mail addresses and/or randomly assigned telephone extensions can be resolved to the user's real contact information based upon records stored in a contact data store (e.g., contact data store 320 of FIG. 3).

At stage 520, a lead can be submitted to the provider including obfuscated contact information associated with the user. The lead can be submitted, for example, by a communications interface (e.g., communications interface 350 of FIG. 3). The communications interface can be controlled, for example, by a contact control module (e.g., contact control module 340 of FIG. 3). In some implementations, the obfuscated contact information can be submitted to the provider based upon input received from the user. For example, the user can specify which of a plurality of qualified providers to which the obfuscated contact information and service information is provided.

At stage 525, communication can be received from the provider directed to the obfuscated contact information. The communication can be received, for example, by a communications interface (e.g., communications interface 350 of FIG. 3). The obfuscated contact information can cause the communication to be routed to a lead management system (e.g., lead management system 110 of FIG. 1) associated with the communications interface based upon a domain or a telephone number associated with the communication. For example, the lead management system can receive all electronic messages addressed to an associated domain.

At stage 530, the communication is presented to the user. The communication can be presented to the user, for example, by a communications interface (e.g., communications interface 350 of FIG. 3). In some implementations, the communications interface can resolve the obfuscated contact information to the user contact information by querying a contact data store (e.g., contact data store 320 of FIG. 3) for an associated user contact address. For example, if the obfuscated contact information is a randomly assigned e-mail address, the communications interface can query the data store to identify a contact address associated with the user and can present the communication to the user using the identified contact address.

Figure 6:
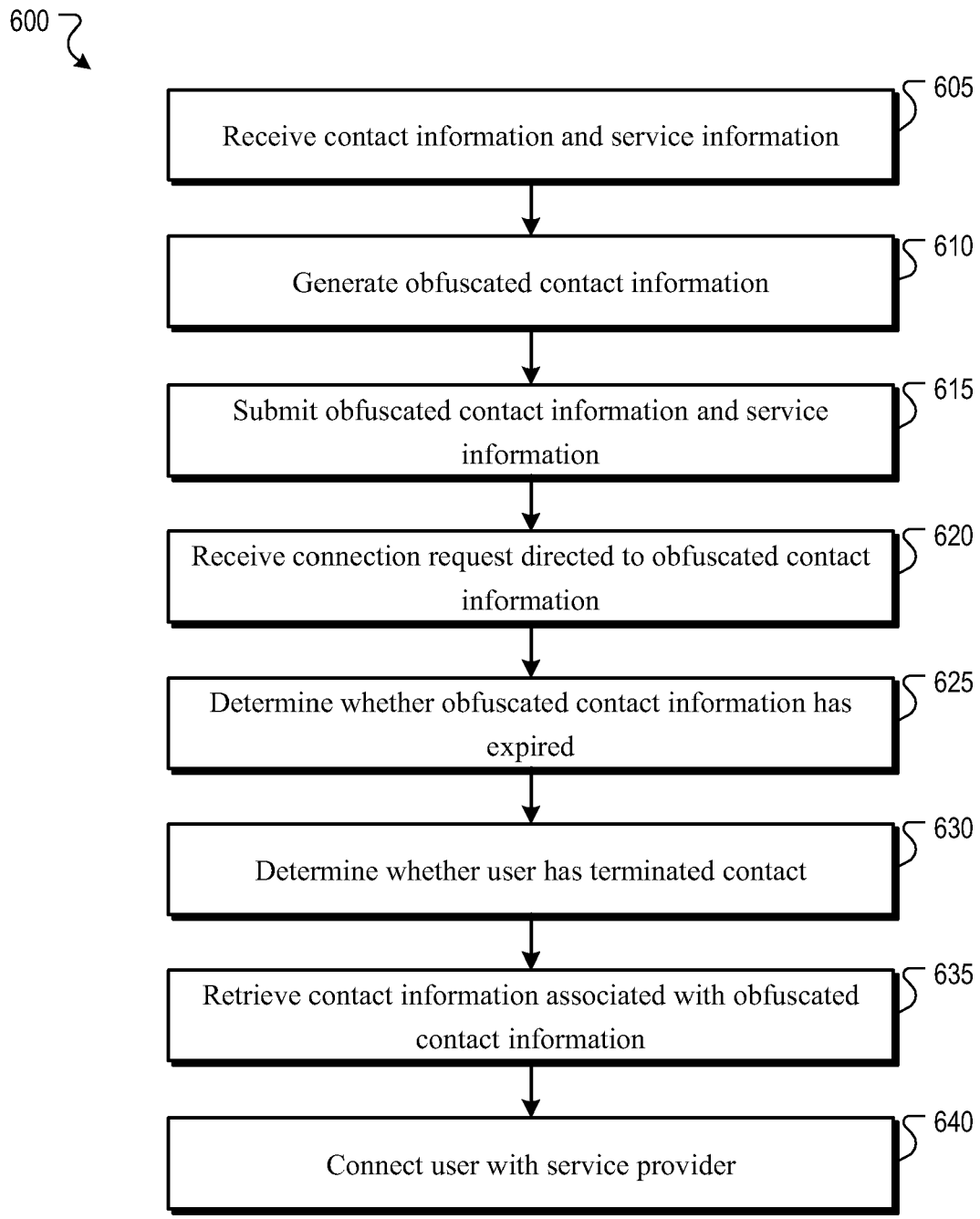
FIG. 6 is a flowchart of an example method for lead management with contact control.

FIG. 6 is a flowchart of an example method 600 for lead management with contact control. At stage 605, service information and contact information can be received. Service information and contact information can be received, for example, by a communications interface (e.g., communications interface 350 of FIG. 3) through a user interface provided by a user interface module (e.g., user interface module 310 of FIG. 3). and specifies service information associated with the user's requirements. In some implementations, the service information can be compared to provider information supplied by providers to identify qualified providers. In further implementations, qualified providers can be based upon the relevance of the provider information to the service information supplied by the user and based upon bidding information associated with the providers. Qualified providers can be presented to the user, for example, using a user interface provided by the user interface module.

At stage 610, obfuscated contact information can be generated. Obfuscated contact information can be generated, for example, by an obfuscation module (e.g., obfuscation module 330 of FIG. 3). In some implementations, the obfuscated contact information can include randomly assigned e-mail addresses and/or randomly assigned telephone extensions. The randomly assigned e-mail addresses and/or randomly assigned telephone extensions can be resolved to the user's real contact information based upon records stored in a contact data store (e.g., contact data store 320 of FIG. 3).

At stage 615, obfuscated contact information and service information can be submitted to the provider. The obfuscated contact information and service information can be submitted, for example, by a communications interface (e.g., communications interface 350 of FIG. 3). The communications interface can be controlled, for example, by a contact control module (e.g., contact control module 340 of FIG. 3). In some implementations, the obfuscated contact information can be submitted to the provider based upon input received from the user. For example, the user can specify which of a plurality of qualified providers to which the obfuscated contact information and service information is provided.

At stage 620, a connection request directed to the obfuscated contact information is received. The connection request can be received, for example, by a communications interface (e.g., communications interface 350 of FIG. 3). The connection request, in various examples, can be an e-mail message, a telephone connection request, an instant messaging request, a video conferencing request, or a request to communicate with the user using any other type of media.

At stage 625, a determination is made whether the obfuscated contact information has expired. The determination of whether the obfuscated contact information has expired can be made, for example, by a contact control module (e.g., contact control module 340 of FIG. 3). In some implementations, the contact control module can use the obfuscated contact information to retrieve preferences associated with the user from a contact data store (e.g., contact data store 320 of FIG. 3). In further implementations, the expiration of obfuscated contact information can be based upon the particular provider attempting to establish contact with the user. In various implementations, the expiration of the obfuscated contact information can be static or dynamic, for example, based upon the system default setup or based upon user preferences. If the obfuscated contact information has expired, no further communications directed to the user using the obfuscated contact information will be presented by the lead management system.

If stage 625 determines that the obfuscated contact information has not expired, then at stage 630, a determination is made whether a user has terminated contact with the provider. The determination of whether a user has terminated contact with the provider can be made, for example, by a contact control module (e.g., contact control module 340 of FIG. 3). In some implementations, the user provide a termination request associated with a provider through a user interface provided by a user interface module (e.g., user interface module 310 of FIG. 3). Upon receiving a termination request from the user associated with a provider, no further communications directed to the user using the obfuscated contact information will be presented by the lead management system.

If stage 630 determines that the user has not terminated contact with the provider, then at stage 635, contact information associated with obfuscated contact information is retrieved. The contact information can be retrieved, for example, by a contact control module (e.g., contact control module 340 of FIG. 3) in conjunction with a contact data store (e.g., contact data store 320 of FIG. 3). In some implementations, the contact control module can query the contact data store using the obfuscated contact information. The record retrieved will include the contact information associated with the user.

At stage 640, the user can be connected to the service provider. The user can be connected to the service provider, for example, by a contact control module (e.g., contact control module 340 of FIG. 3) in conjunction with a communications interface (e.g., communications interface 350 of FIG. 3). In some implementations, the connection between the user and the provider is maintained by the communications interface until a termination signal is received from either or both of the user or the provider.

Although the implementations described above have been focused on web-based collection of leads, in other implementations, the lead collection can occur using telephones, or collection of lead information through third party websites. In those implementations, collecting lead information using telephones, the receipt of contact information and service information can occur over the telephone. In some examples, an agent can receive the contact information and service information and enter it into the lead management system. In other examples, an integrated voice response system can be used to collect contact information and service information from a user. The captured speech responses can be transmitted directly to selected providers, or a speech to text conversion module can convert the speech into text for forwarding to the selected providers.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims. The same experimental techniques work for any web page, not merely advertising landing pages. Any web site owner can experimentally determine how good his or her web site design is and which web pages should be targeted for improvement. The web site owner merely needs to designate a test page and a goal page. A goal rate can be calculated as the percentage of browsing users who, having reached the test page, go on to reach the goal page. The goal rate can be interpreted as a measure of success. In this specification, in order to adopt the commonly used terminology, "landing page" is used to include all test pages whether or not arrived at through an advertisement, and "conversion page" is used to include all goal pages.

These and other implementations are within the scope of the following claims.

What is claimed is:

1. A computer-implemented method for managing provider leads, comprising:
   receiving a request from a user to locate a provider associated with a product or service offering specified by the request;
   receiving service information and contact information from the user, the contact information including one or more of an actual e-mail address of the user and an actual telephone number of the user, the service information being related to the service requested by the user;

generating obfuscated contact information associated with the user wherein the obfuscated contact information includes one or more of a generated e-mail address that is resolved to the actual e-mail address of the user and that differs from the actual e-mail address and an assigned telephone extension that is resolved to the actual telephone number of the user and that differs from the actual telephone number;

storing a record in a contact data store, the record comprising the service information, contact information, and obfuscated contact information associated with the user;

submitting a lead to the provider, the lead comprising the service information and the obfuscated contact information associated with the user;

receiving a communication from the provider comprising audio, video or textual communication data and the obfuscated contact information;

determining whether a contact period associated with the request remains open;

retrieving the record from the contact data store based upon the obfuscated contact information, the record comprising the contact information associated with the user; and presenting the communication to the user using the contact information associated with the user; wherein the contact period defines an expiration period after which no communication with the user can be made.

2. The computer-implemented method of claim 1, further comprising receiving data defining the contact period from the user.

3. The computer-implemented method of claim 1, further comprising:

determining whether a termination request from the user has been received, the termination request indicating that no further communications from the provider be presented to the user; and presenting the communications to the user using the contact information associated with the user provided that no termination request has been received.

4. The computer-implemented method of claim 1, further comprising:

providing a list comprising a plurality of providers to the user;

receiving a provider selection from the user indicating one or more selected entities from the list, the one or more selected entities comprising entities with whom the user requests communications;

submitting a lead to the one or more selected entities, the lead comprising the service information and the obfuscated contact information associated with the user;

receiving communications from the one or more entities comprising audio, video or textual communication data and the obfuscated contact information; and presenting the communications to the user using the contact information associated with the user.

5. The computer-implemented method of claim 4, further comprising:

analyzing the service information associated with the user in comparison to provider information supplied by the entities and stored in a provider data store;

identifying a plurality qualified entities based upon the comparison of the service information to the provider information;

wherein the list provided to the user comprises a plurality of qualified entities provided in an order based upon the relevance of the qualified providers to the request.

6. The computer-implemented method of claim 5, further comprising receiving provider information from the plurality of providers to identify the qualified providers.

7. The computer-implemented method of claim 1, wherein, for the assigned telephone extension, the communication comprises a phone call or a text message from the provider, and the obfuscated contact information comprises an extension within a telephone exchange that is routed to the telephone number associated with the user.

8. The computer-implemented method of claim 7, further comprising:

generating a connection request to the telephone number associated with the user;

determining that the connection request has resulted in a connection to a voice mail system;

automatically disconnecting the voice mail system;

recording a message from the provider; and forwarding the message to the user using an e-mail address or the telephone number associated with the user.

9. The method of claim 1, wherein the obfuscated contact information includes a generated e-mail address; and wherein receiving a communication from the provider comprises receiving a message addressed to the generated e-mail address.

10. The method of claim 1, wherein the generated e-mail address is generated randomly.

11. A system comprising:

one or more computers, the one or more computers comprising:

a user interface module providing a user interface operable to receive a request from a user device associated with a user for an offering, the interface further operable to receive service information and contact information associated with the user, the contact information including or more of an actual e-mail address of the user and an actual telephone number of the user;

an obfuscation module operable to generate obfuscated contact information associated with the user wherein the obfuscated contact information includes one or more of a generated e-mail address that is resolved to the actual e-mail address of the user and that differs from the actual e-mail address and an assigned telephone extension that is resolved to the actual telephone number of the user and that differs from the actual telephone number;

a contact data store operable to store contact information and obfuscated contact information associated with the user;

a contact control module operable to determine whether a contact period associated with the request is open, the contact control module being operable to instruct the communications interface whether to present the communication to the user based upon the determination; wherein the contact period defines an expiration period after which no communication with the user can be made; and a communications interface operable to submit the obfuscated contact information and service information to a provider associated with the requested offering, the communications interface being further operable to receive a communication from the provider, to retrieve contact information associated with the obfuscated contact information and to provide the communication to the user using the contact information associated with the user.

12. The system of claim 11, wherein the user interface is operable to receive data defining the contact period from the user.

13. The system of claim 11, wherein the contact control module is operable to determine whether the contact period associated with the request has expired, the contact control module being operable to instruct the communications interface whether to present the communication to the user based upon the determination.

14. The system of claim 11, further comprising a contact control module operable to determine whether a termination request from the user has been received, the termination request indicating that no further communications from the provider be presented to the user, the contact control module being operable to instruct the communications interface whether to present the communication based upon the determination.

15. The system of claim 11, wherein the user interface module is further operable to provide a list to the user, the list comprising a plurality of providers, and the user interface is further operable to receive a provider selection from the user indicating one or more selected providers from the list, the one or more selected providers comprising providers with whom the user would like to communicate and the system further comprises:
   a contact control module operable to submit the obfuscated contact information and service information to the one or more selected providers using the communications interface;
   the communications interface being operable to receive communications from the one or more selected providers, the communications comprising content and the obfuscated contact information, and being further operable to forward the communications to the user using the contact information associated with the user responsive to the contact control module.

16. The system of claim 15, further comprising an analysis module operable to analyze the service information associated with the user with respect to provider information supplied by the providers, the analysis module being operable to identify a plurality of qualified providers based upon the analysis, wherein the list provided to the user comprises a plurality of qualified providers.

17. The system of claim 16, further comprising a provider interface operable to receive provider information from the plurality of providers.

18. The system of claim 11, wherein, for the assigned telephone extension, the communication comprises a phone call or a text message from the provider, and the obfuscated contact information comprises an extension within a telephone exchange that is routed to the telephone number associated with the user based upon contact data stored in the contact data store.

19. The system of claim 11, further comprising:
   a search engine operable to receive a search query through a search interface, the search engine being operable to generate rules used to identify when the search query is related to a product or service associated with an advertiser and to generate the request based upon identifying that the search query is related to a product or service associated with the advertiser, the advertiser being associated with a provider of the product or service.

20. One or more machine-readable storage device, operable to cause one or more data processing apparatus to perform operations comprising:
   providing a user interface operable to receive a request from a user device associated with a user and to collect service or product information and contact information associated with the user, the contact information including one or more of an actual e-mail address of the user and an actual telephone number of the user;
   generating obfuscated contact information associated with the user wherein the obfuscated contact information includes one or more of a generated e-mail address that is resolved to the actual e-mail address of the user and that differs from the actual e-mail address;
   storing a record in a contact data store, the record comprising the contact information, obfuscated contact information and contact preferences associated with the user;
   submitting the anonymous contact information and the service or product information associated with the user to a provider; receiving a communication directed to the anonymous contact information and comprising a quote associated with the provider; and
   retrieving the record from the contact data store based upon the obfuscated contact information, the record comprising the contact information and contact preferences associated with the user;
   determining whether a contact period associated with the request remains open;
   determining whether to forward the communication to the user based upon the contact preferences; and
   providing the communication to the user based upon the determination; wherein the contact period defines an expiration period after which no communication with the user can be made.

* * * * *

UNITED STATES PATENT AND TRADEMARK OFFICE
CERTIFICATE OF CORRECTION

| | | |
|---|---|---|
| PATENT NO. | : 8,214,396 B2 | Page 1 of 1 |
| APPLICATION NO. | : 12/104858 | |
| DATED | : July 3, 2012 | |
| INVENTOR(S) | : Amit Jain | |

It is certified that error appears in the above-identified patent and that said Letters Patent is hereby corrected as shown below:

Cover Page
Item (57), Abstract, line 5, after "submit" delete "an"

Column 13
Line 62, after "plurality" insert -- of --

Column 14
Line 34-35, delete "including or" and insert -- includes one or, --

Signed and Sealed this
Fourth Day of September, 2012

David J. Kappos
*Director of the United States Patent and Trademark Office*